(12) United States Patent
Shirasawa et al.

(10) Patent No.: US 8,114,174 B2
(45) Date of Patent: Feb. 14, 2012

(54) REACTION DEVICE

(75) Inventors: Takeshi Shirasawa, Wakayama (JP); Yasukazu Kumita, Wakayama (JP)

(73) Assignee: Kao Corporation, Tokyo (JP)

( * ) Notice: Subject to any disclaimer, the term of this patent is extended or adjusted under 35 U.S.C. 154(b) by 722 days.

(21) Appl. No.: 12/226,014

(22) PCT Filed: Apr. 3, 2007

(86) PCT No.: PCT/JP2007/057463
§ 371 (c)(1),
(2), (4) Date: Oct. 3, 2008

(87) PCT Pub. No.: WO2007/114438
PCT Pub. Date: Oct. 11, 2007

(65) Prior Publication Data
US 2009/0249692 A1    Oct. 8, 2009

(30) Foreign Application Priority Data
Apr. 5, 2006    (JP) .................. 2006-104117

(51) Int. Cl.
*C01B 3/12* (2006.01)
*C01B 3/16* (2006.01)
*C10J 3/46* (2006.01)
*B01J 7/00* (2006.01)
*B01J 8/02* (2006.01)

(52) U.S. Cl. ............ 48/61; 48/108; 48/127.9; 48/197 R; 48/204; 422/211; 422/222; 423/650; 423/651; 423/652; 423/655

(58) Field of Classification Search .................. 423/650, 423/651, 652, 655; 422/211, 222; 48/61, 48/108, 127.9, 197 R, 204
See application file for complete search history.

(56) References Cited

U.S. PATENT DOCUMENTS

| | | | |
|---|---|---|---|
| 4,810,472 A * | 3/1989 | Andrew et al. | 422/629 |
| 6,436,354 B1 * | 8/2002 | Priegnitz et al. | 422/198 |
| 2005/0191532 A1 | 9/2005 | Kim et al. | |
| 2006/0008684 A1 | 1/2006 | Park et al. | |

FOREIGN PATENT DOCUMENTS

| | | |
|---|---|---|
| JP | 2004-63131 A | 2/2004 |
| JP | 2004-256387 A | 9/2004 |
| JP | 2005-243649 A | 9/2005 |
| JP | 2005-246115 A | 9/2005 |
| JP | 2006-19281 A | 1/2006 |

OTHER PUBLICATIONS

Chinese Office Action issued on Aug. 20, 2010 in corresponding Chinese Patent Application No. 200780000526.8.
Hirai et al., "Production of Hydrogen by Steam Reforming of Glycerin on Ruthenium Catalyst," Energy & Fuels, vol. 19, 2005, pp. 1761-1762.
"Development on Catalyst for Glycerin Steam Reforming Reaction," Summary of Symposiums and Lectures on Petroleum and Petrochemistry, No. 34, 2005, pp. 248.
"Gasification of glycerol with raney nickel in hot water," Proceeding of Lectures, the Chemistry Society of Japan, 1 H3-17, vol. 2, No. 85, 2005, pp. 1430.

* cited by examiner

*Primary Examiner* — Timothy Vanoy
(74) *Attorney, Agent, or Firm* — Birch, Stewart, Kolasch & Birch, LLP

(57) ABSTRACT

A reaction device 10 is used for producing water gas from polyhydric alcohol and water. The reaction device 10 includes a reactor 13 which has a reaction field 14 where a catalyst is provided inside and a reaction fluid flows. The catalyst 17 has a surface extending in a direction of flow of the reaction fluid.

5 Claims, 4 Drawing Sheets

REACTION DEVICE

TECHNICAL FIELD

The present invention relates to a reaction device used for producing water gas from polyhydric alcohol and water and to a water gas production method which is carried out using the reaction device.

BACKGROUND ART

Glycerin is a raw material produced as a byproduct in production of bio-diesel fuel, practical use of which in the future has been expected. Glycerin is derived from a natural product called carbon neutral and has higher significance under current energy-related circumstances in view of environmental protection.

Thus, to produce hydrogen via reaction-reforming using glycerin is socially very significant. The produced hydrogen is applicable to chemical materials for fuel cells, hydrogen-added reactions, etc., and fuel sources for hydrogen vehicles.

However, the current circumstances are that development in this technique has not been much studied or reported and that only several studies have been just reported in academic papers in recent years.

For example, it has been reported in non-patent document 1 that the types of catalyst metals which are excellent in steam reforming from glycerin have been studied using a fixed bed reactor. In non-patent document 2, the possibility of producing hydrogen from glycerin using nickel catalyst in a subcritical water field has been reported. However, the methods disclosed in non-patent documents 1 and 2 can produce hydrogen at a certain level of purity but are not satisfactory in production as to the time necessary for reaction and yield.

There are only several studies and reports on the reactors used for steam reforming of glycerin. However, there are documents which disclose similar techniques relating to a methanol reforming device used for fuel cells.

Patent document 1 discloses a microreactor for reforming a raw material to produce hydrogen gas. The microreactor has a metal substrate having microgrooves on its one surface, a heating element set on the other surface of the metal substrate via an insulation film, a catalyst carried in the microgrooves, and a cover member having a raw material inlet and a gas outlet and joined to the metal substrate so as to cover the microgrooves.

Patent document 2 discloses a chemical reaction apparatus having a continuous reaction path. The chemical reaction apparatus includes: a temperature adjustment layer which corresponds to a region including the reaction paths and supplies a certain quantity of heat; a first electrode layer formed in a first region over the temperature adjustment layer; an insulating layer formed in a second region other than the first region over the temperature adjustment layer; and a second electrode layer lying over the first electrode layer for supplying power via the first electrode layer to produce a certain quantity of heat in the temperature adjustment layer, wherein the insulating layer is integral with the first electrode layer and is made of an insulating material obtained by oxidizing a conductive material of the first electrode layer.

[Non-patent Document 1] Summaries of Symposiums and Lectures on Petroleum and Petrochemistry, 2005, No. 34, p. 248
[Non-patent Document 2] Proceedings of Lectures, the Chemical Society of Japan, 2005, No. 85, Vol. 2, p. 1430
[Patent Document 1] Japanese Laid-Open Patent Publication No. 2004-256387
[Patent Document 2] Japanese Laid-Open Patent Publication No. 2004-63131

DISCLOSURE OF INVENTION

A reaction device of the present invention is for use in production of water gas from polyhydric alcohol and water, the device including a reactor which has a reaction field where a catalyst is provided inside and a reaction fluid flows, wherein the catalyst has a surface extending in a direction of flow of the reaction fluid.

A water gas production method of the present invention is for producing water gas from polyhydric alcohol and water, including the step of producing water gas by supplying a reaction fluid containing polyhydric alcohol and water to flow in a reaction field provided with catalyst which has a surface extending in a direction of flow of the reaction fluid such that a reaction of polyhydric alcohol and water occurs.

BEST MODE FOR CARRYING OUT THE INVENTION

Hereinafter, embodiments will be described in detail with reference to the drawings.

Embodiment 1

<Reaction Device>

Figure 1:
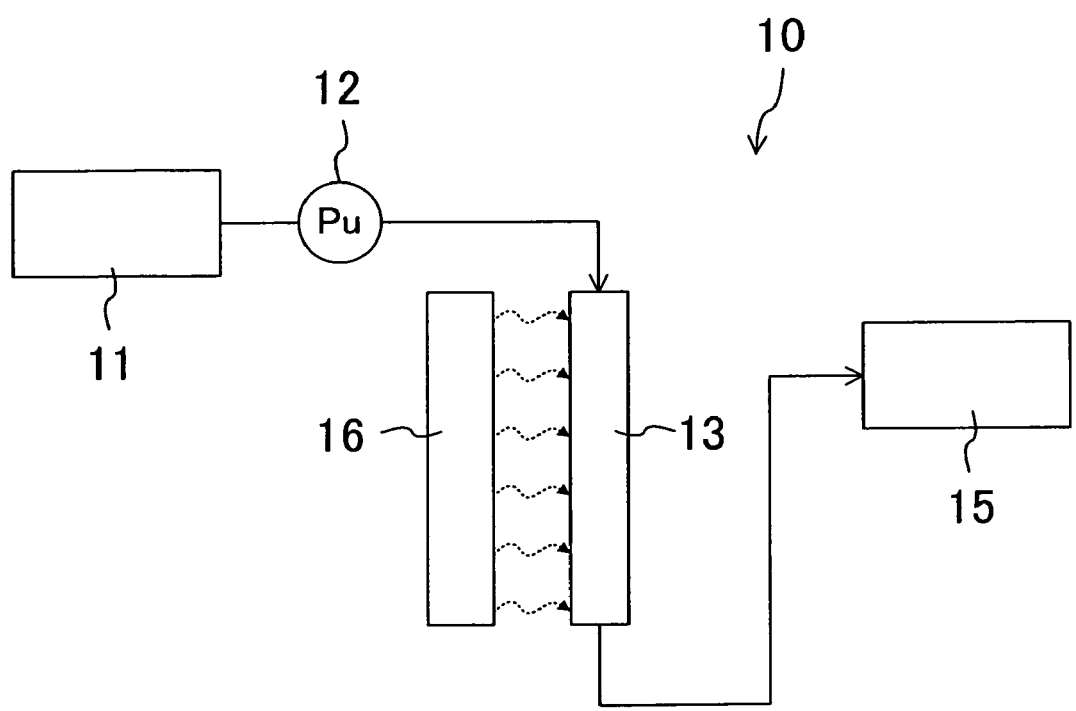
FIG. 1 shows a structure of a reaction device according to Embodiment 1.

FIG. 1 shows a reaction device 10 according to Embodiment 1.

The reaction device 10 is a continuous type reactor capable of continuously producing a reaction product. The reaction device 10 includes a pipe extending from a reaction fluid supplier 11, which is a reaction fluid source, to a product reservoir 15. The reaction device 10 also includes a fluid supplying pump 12 and reactor 13 which are provided in series at some midpoints in the pipe in this order when viewed from the upper reach to the lower reach with a certain interval between the pump 12 and the reactor 13. The reaction device 10 further includes a heater 16 which is provided such that the heater 16 can heat the reactor 13.

The reaction device 10 is used for production of water gas, wherein: a reaction fluid, particularly a mixture of polyhydric alcohol (e.g., glycerin, propanediol, or the like) as the raw material and water, is supplied from the reaction fluid supplier 11 to the reactor 13 via the fluid supplying pump 12; polyhydric alcohol and water are reacted in the reactor 13 so that water gas is produced; and the reaction fluid containing the produced water gas is stored in the product reservoir 15.

The reactor 13 has an inlet through which the reaction fluid enters and an outlet through which the reaction fluid exits. The reactor 13 also has a reaction path 13a inside the reactor 13 between the inlet and the outlet. The reaction path 13a has the form of an elongated hole. The reaction path 13a constitutes a reaction field 14 in which the reaction fluid flows through and reacts.

The reaction path 13a of the reactor 13 may be formed such that a flat member which has a groove formed in its surface by cutting or any other processing is tightly joined with another flat member. Alternatively, the reaction path 13a may be formed by a tubular member already complete, such as a square tube, circular tube, or the like.

The cross-sectional shape of the reaction path 13a may be, for example, circular, semicircular, elliptic, semielliptic, square, rectangular, trapezoidal, parallelogramic, indeterminate, etc. The longitudinal passage of the reaction path 13a between the inlet and the outlet may have a linear shape, circular shape, meander shape, spiral shape, etc.

The area of the cross section of the reaction path 13a encompassed by the cross-sectional perimeter, converted to an equivalent diameter, is preferably from 0.05 mm to 50 mm. The reaction in the reaction path 13a is highly endothermic and, in view of achieving such a highly-endothermic reaction more desirably, the cross-sectional area of the reaction path 13a is more preferably from 0.05 mm to 10 mm, even more preferably from 0.1 mm to 3 mm, with which the thermal conductivity can be improved. Note that the "equivalent diameter" means the diameter of a perfect circle which has an area equal to the cross-sectional area of the reaction path 13a.

The reaction path 13a which constitutes the reaction field 14 is provided with catalyst 17. The catalyst 17 has a surface extending in the direction of flow of the reaction fluid.

Preferable examples of the catalyst 17 include metals applicable for steam reforming of alcohol. Of these metals, any of the metals of Group 8 to Group 12, preferably any of the metals of Group 8 to Group 10, may be industrially suitable. The specific examples of the catalyst include iron, cobalt, nickel, copper, zinc, ruthenium, rhodium, palladium, osmium, iridium, and platinum. Of these examples, the metals of Group 8 to Group 10 are preferable in view of industrial cost, availability and safety. More preferably, the catalyst is nickel, ruthenium, palladium, or platinum. As a matter of course, some of these examples may be used together. Alternatively, the catalyst may be used with the oxidation state of its surface being controlled by a pretreatment, such as reduction with hydrogen or the like, oxidation with oxygen or air, etc.

Figure 2A:
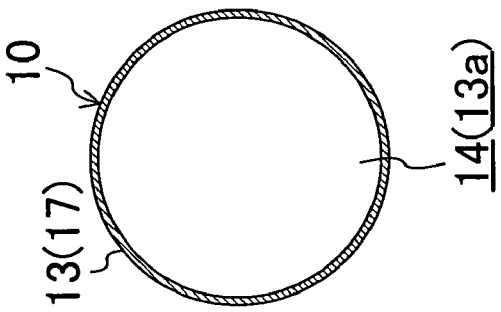
FIG. 2 is a cross-sectional view of a reactor.
Figure 2B:
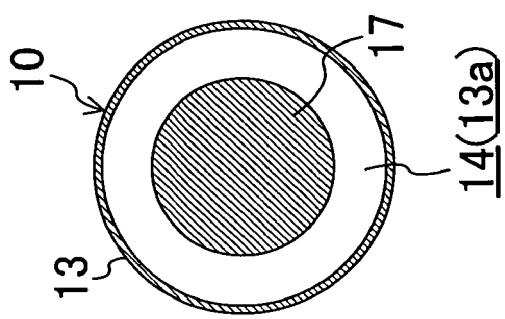
Figure 2C:
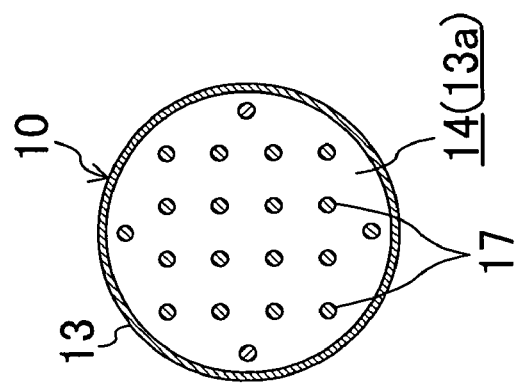
Figure 3:
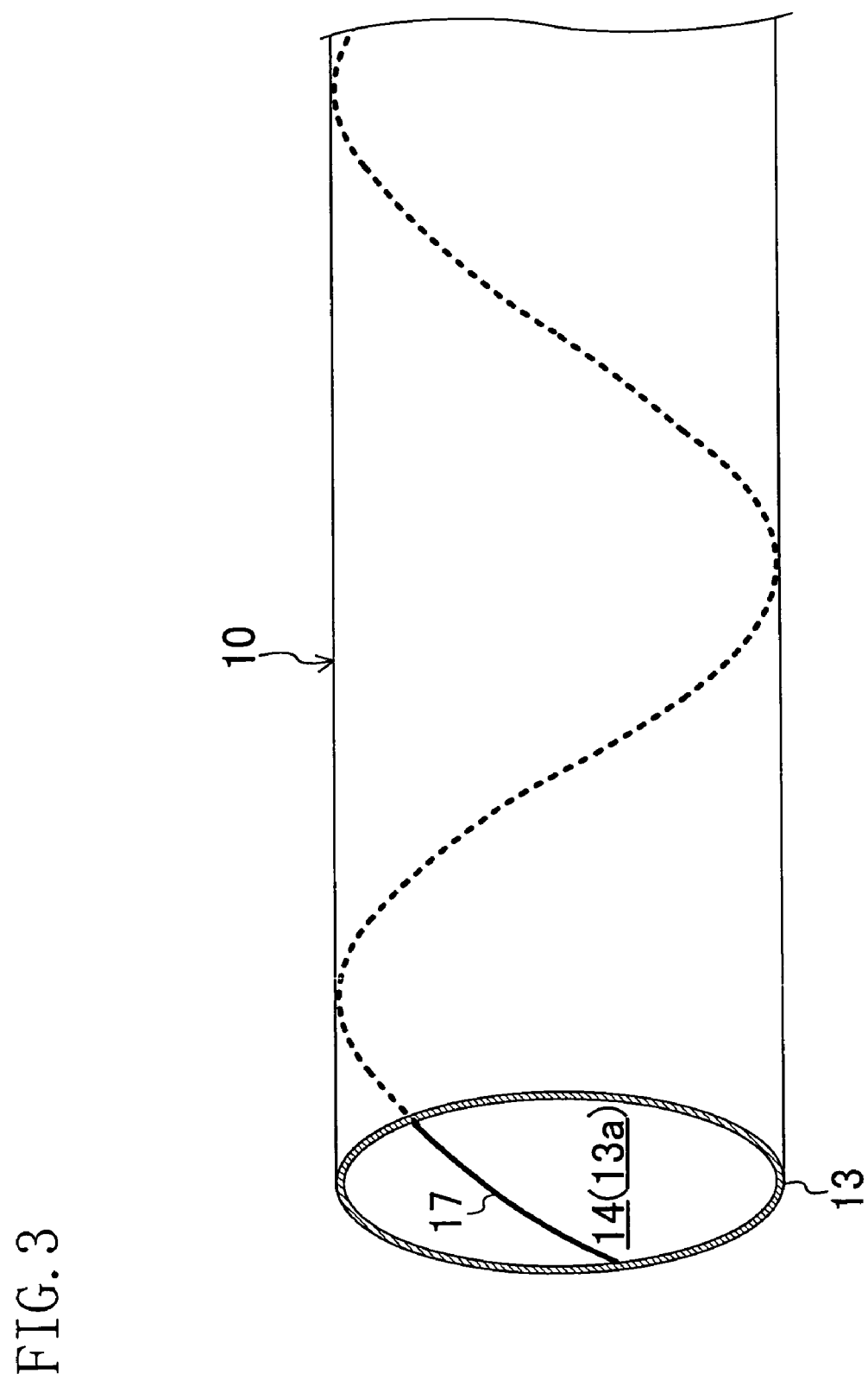
FIG. 3 is a perspective view of a reactor.

As shown in FIG. 2(a) and FIG. 2(b), the catalyst 17 is in the form of, for example, an elongated structure, e.g., a linear structure, such as a metal wire, a bundle of wires, or a stranded cable, or an elongated plate structure. Alternatively, as shown in FIG. 2(c), the catalyst 17 constitutes the inner wall of the reaction path 13a inside the reactor 13. The catalyst 17 may have a shape continuously extending in the direction of flow of the reaction fluid. Alternatively, the catalyst 17 may have separate parts aligned with intervals in the direction of flow of the reaction fluid.

Where the catalyst 17 has the shape of an elongated structure, the outer surface corresponds to a surface extending in the direction of flow of the reaction fluid. In this case, the reactor 13 having the reaction path 13a formed by flat members may have the catalyst 17 in the groove formed in one of the flat members. The reactor 13 having the reaction path 13a formed by a tubular member already complete may have the catalyst 17 inserted in the reaction path 13a. Alternatively, the catalyst 17 may be provided in the reaction path 13a in the form of a spiral at a certain pitch in the direction of flow of the reaction fluid as shown in FIG. 3. Still alternatively, parts of catalyst metal may be aligned with intervals in the direction of flow of the reaction fluid such that the catalyst metal parts as a whole constitute a surface extending in the direction of flow of the reaction fluid. The catalyst 17 may be provided entirely across the whole reach of the reactor 13 between the inlet and the outlet or may be provided partially over the reach of the reactor 13 between the inlet and the outlet, and any of these arrangements is possible.

Where the inner wall of the reaction path 13a is formed by the catalyst 17, the surface of the inner wall corresponds to the surface extending in the direction of flow of the reaction fluid. In this case, a metal which constitutes the inner wall of the reaction path 13a may be a catalyst metal. Alternatively, the inner wall of the reaction path 13a may be coated with the catalyst 17 by plating, sputtering, painting plus drying, or any other technique after general construction of the reaction path 13a. The inner wall may be partially formed by a catalyst metal such that the catalyst metal parts of the wall occur with intervals in the direction of flow of the reaction fluid. The catalyst 17 may be provided entirely across the whole reach of the reactor 13 between the inlet and the outlet or may be provided partially over the reach of the reactor 13 between the inlet and the outlet, and any of these arrangements is possible.

An applicable index indicative that the catalyst 17 has a surface extending in the direction of flow of the reaction fluid is "A/S" where S is the surface area of a unit of catalyst and A is the projected area of the unit of catalyst on a plane perpendicular to the direction of flow of the reaction fluid. The "unit of catalyst" refers to one of particles of catalyst, one of lines of catalyst, or one of a series of foils of catalyst. Specifically, in the case where the catalyst is in the form of spherical particles, $A/S=0.25(-)$. In the case where the catalyst has a cylindrical shape of diameter D and length L, the value of A/S varies depending on the installment direction of the catalyst. For example, in the case where the catalyst is installed such that the direction of the length of the catalyst, L, is identical to the direction of flow of the reaction fluid and $L=2D$, $A/S=0.1$ ($-$). In the case where the catalyst exists in the inner wall of the reaction path 13a and the reaction fluid passes through the reaction path 13a to react, the projected area A is 0 ($A=0$), and hence, $A/S=0(-)$. A particle having an indeterminate shape is deemed to have the form of an elliptical sphere which holds the maximum length values in the x, y and z axes, such that the values of the surface area and projected area of a unit of particle obtained from this elliptical shape can be used for examination.

In a reaction device having a plurality of units of catalyst, $\Sigma A/\Sigma S$ (where $\Sigma S$ is the total sum of surface areas S of catalyst units and $\Sigma A$ is the total sum of projected areas A of the catalyst units) can be used as the aforementioned index. It should be noted that, in this specification, the total sums are represented by $\Sigma A$ and $\Sigma S$ even in a case where the reaction device only has one catalyst unit.

The value of $\Sigma A/\Sigma S$ is preferably 0 to 0.2($-$), more preferably 0 to 0.1($-$), even more preferably 0 to 0.07($-$), and even more preferably 0 to 0.05($-$). The catalyst 17 is preferably provided in the reaction path 13a such that, in any traverse section of the reaction path 13a, the catalyst 17 exists in the area of radius of 10 mm. More preferably, the catalyst 17 exists in the area of radius of 5 mm. With such an arrangement, the distance between the reaction fluid and the catalyst 17 is 20 mm or less at any location in the reaction field 14, so that desirable reactivity and aldehyde selectivity are achieved. Specifically, for example, as shown in FIG. 2(d), the reaction path 13a may be in the form of an elongated slit wherein the inner wall is formed by the catalyst 17 and a traverse section has a space of 20 mm or less.

In the case where the reaction path 13a is formed by a plurality of catalyst units of the catalyst 17, the reaction path 13a is preferably structured such that the reaction fluid flows smoothly in the vicinity of the catalyst 17 without stagnation. If without a stagnation region (i.e., dead space) in the vicinity of the catalyst 17, the reaction residence time distribution of the reaction fluid can be narrowed, whereby the reaction fluid residing for a long time is prevented from causing a side reaction, such as carbonization, or the like. Specifically, the catalyst 17 is preferably located such that the catalyst units do not have a point contact with each other or have narrow gaps between each other. More specifically, the minimum distance between catalyst units is preferably 0.2 mm or more, more preferably 0.5 mm or more, even more preferably 1 mm or more. It should be noted that a reactor called "microreactor" has a narrow flow path smaller than 1 mm, and in such a case, the minimum distance between catalyst units is not limited to the ranges mentioned above so long as no stagnation occurs in the flow path.

The fluid supplying pump 12 supplies the reaction fluid output from the reaction fluid supplier 11 to the reactor 13. Examples of the fluid supplying pump 12 for liquid reaction fluid include a volute pump, diffuser pump, volute diagonal pump, diagonal pump, axial flow pump, gear pump, screw pump, cam pump, vane pump, piston pump, plunger pump, diaphragm pump, vortex flow pump, viscosity pump, airlift pump, jet pump, electromagnetic pump, etc. Among these examples, a pump which generates small pulsating flow is preferably. This is because advantages in reaction are achieved such that passage of the reaction fluid through the flow path without pulsating flow ensures a uniform and stable flow of the fluid and stable mixing phenomenon at any location in the flow path without causing problems in the reaction, and hence, stoichiometric conditions for desirable reactivity and high selectivity are uniformly achieved. The reaction fluid may be supplied to the reactor 13 by means of pressure difference instead of using the fluid supplying pump 12.

Examples of the heating system of the heater 16 include a heat exchange method by means of a heated medium, such as hot oil, vapor, etc., a heat transfer method via contact or radiation with a heating element, such as an electric heater, or the like, a method which utilizes a heat pump, etc.

Considering that the reaction occurs at a high temperature, the above-described components of the reaction device 10 need to be made of a material whose melting point is higher than the reaction temperature. Also, considering that the reaction temperature is desirably reached as early as possible, the components are preferably made of a material of excellent heat conductivity. In view of these respects, each of the components of the reaction device 10 is preferably made of a metal material. Examples of the metal material include single-element metals, such as aluminum, titanium, chromium, iron, cobalt, nickel, copper, zinc, zirconium, etc., and alloys multiply containing these single-element metals. Specific examples of the alloys include austenite steels represented by SUS304 and SUS316, martensite steels represented by SUS420, two-phase stainless steels of ferrite and austenite represented by SUS329, Ni alloys represented by Hastelloy C276 and Inconel 600, titanium alloys represented by 6-4 titanium alloy, etc. As a matter of course, each of the components can be made of one of these materials solely or can be made of two or more of these materials together.

<Method for Producing Water Gas>

Next, a method for producing water gas using the reaction device 10 of this embodiment is described.

The water gas production method of this embodiment uses polyhydric alcohol and water to produce a mixture gas of hydrogen and carbon monoxide which is called water gas.

Herein, the polyhydric alcohol refers to a compound having such a structure that has a carbon number of 2 or more and has two or more hydroxyls bonded thereto. So long as this structure is satisfied, a group other than hydroxyl, for example, a carboxylic acid group, aldehyde group, or the like, may be bonded thereto. Specific examples of the polyhydric alcohol include dihydric alcohols, such as ethylene diglycol, 1,2-propanediol, 1,3-propanediol, 2,3-hydroxypropanal, 1,2-butanediol, 1,3-butanediol, 1,4-butanediol, tartaric acid, and the like, trihydric alcohols, such as glycerin, 1,2,4-butanetriol, 1,2,6-hexanetriol, and the like, and tetrahydric alcohols, such as pentaerythritol, and the like. Among these examples, ethylene diglycol and glycerin are more desirable in view of economy.

The polyhydric alcohol generates water gas based on Formula (1) shown below. It should be noted that the produced carbon monoxide reacts with water based on the water gas shift reaction of Formula (2) to secondarily produce hydrogen.

[Formulae]

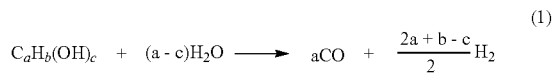

(1)

(2)

According to the water gas production method of this embodiment, a reaction fluid, i.e., a mixture of polyhydric alcohol (raw material) and water, is supplied from the reaction fluid supplier 11 to the reactor 13 via the fluid supplying pump 12.

The phase state of the reaction fluid may be any of liquid, gas, and supercritical fluid or may be a mixed state of these phases. The phase state of the reaction fluid is controlled by adjusting the heating temperature of the reactor 13 heated by the heater 16 and setting the pressure of the reaction fluid by a pressure regulator provided upstream of the product reservoir 15.

In view of desirable progress of reaction, the mix ratio of polyhydric alcohol and water in the reaction fluid is preferably such that the molar ratio of water to carbon atoms included in polyhydric alcohol is from 0.3 to 10, more preferably 1 to 6. (For example, in the case where polyhydric alcohol is glycerin, the mix ratio of glycerin and water in the reaction fluid is, in view of desirable progress of reaction, preferably such that the molar ratio of water to glycerin is 0.9 to 30, more preferably 3 to 18.)

It should be noted that any material other than polyhydric alcohol and water may be mixed in the reaction fluid as necessary so long as the reactivity and yield are not deteriorated. Examples of the material which can be mixed in the reaction fluid include the gases of nitrogen, argon, helium, oxygen, carbon dioxide, etc. The reaction fluid may contain, in addition to polyhydric alcohol and water, an organic compound which does not deteriorate essential reactivity, such as an organic acid, hydrocarbon, alcohol or aldehyde, or a salt thereof, or an inorganic salt which does not deteriorate essential reactivity.

According to the water gas production method of this embodiment, polyhydric alcohol and water react in the reactor 13 to produce water gas.

The reaction time of polyhydric alcohol and water of the reaction fluid is preferably about 0.1 second to 1 hour, more preferably 1 second to 10 minutes. (For example, where polyhydric alcohol is glycerin, the reaction time of glycerin and water of the reaction fluid is preferably about 0.1 second to 1 hour, more preferably 1 second to 10 minutes. Where polyhydric alcohol is propanediol, the reaction time of propanediol and water of the reaction fluid is preferably about 0.1 second to 1 hour, more preferably 1 second to 10 minutes.) The reaction time of polyhydric alcohol and water of the reaction fluid is determined by the residence time of the reaction fluid in the reactor 13 and is therefore controlled by setting the feeding speed of the reaction fluid from the fluid supplying pump 12 according to the volume of the reaction field 14.

The reaction temperature of polyhydric alcohol and water of the reaction fluid is preferably 200° C. to 1000° C., more preferably 300° C. to 700° C. (For example, where polyhydric alcohol is glycerin, the reaction temperature of glycerin and water of the reaction fluid is preferably 200° C. to 1000° C., more preferably 300° C. to 700° C. Where polyhydric alcohol is propanediol, the reaction temperature of propanediol and water of the reaction fluid is preferably about 200° C. to 1000° C., more preferably 300° C. to 700° C.) The reaction temperature of polyhydric alcohol and water of the reaction fluid is controlled by adjusting the heating temperature of the reactor 13 heated by the heater 16.

According to the water gas production method of this embodiment, the reaction fluid containing produced water gas is stored in the product reservoir 15.

The stored water gas is purified to have the qualities required by the use thereof, for example, fuel cell, hydrogen engine fuel, chemical material, etc. The purification of water gas may be achieved by means of, e.g., a gas-permeable membrane, PSA, or the like.

Production of water gas by the use of the above-described reaction device 10 enables high-yield production of water gas from polyhydric alcohol because, in the reaction device 10, catalyst which has a surface extending in the direction of flow of the reaction fluid is provided in the reaction field 14.

Embodiment 2

<Reaction Device>

Figure 4:
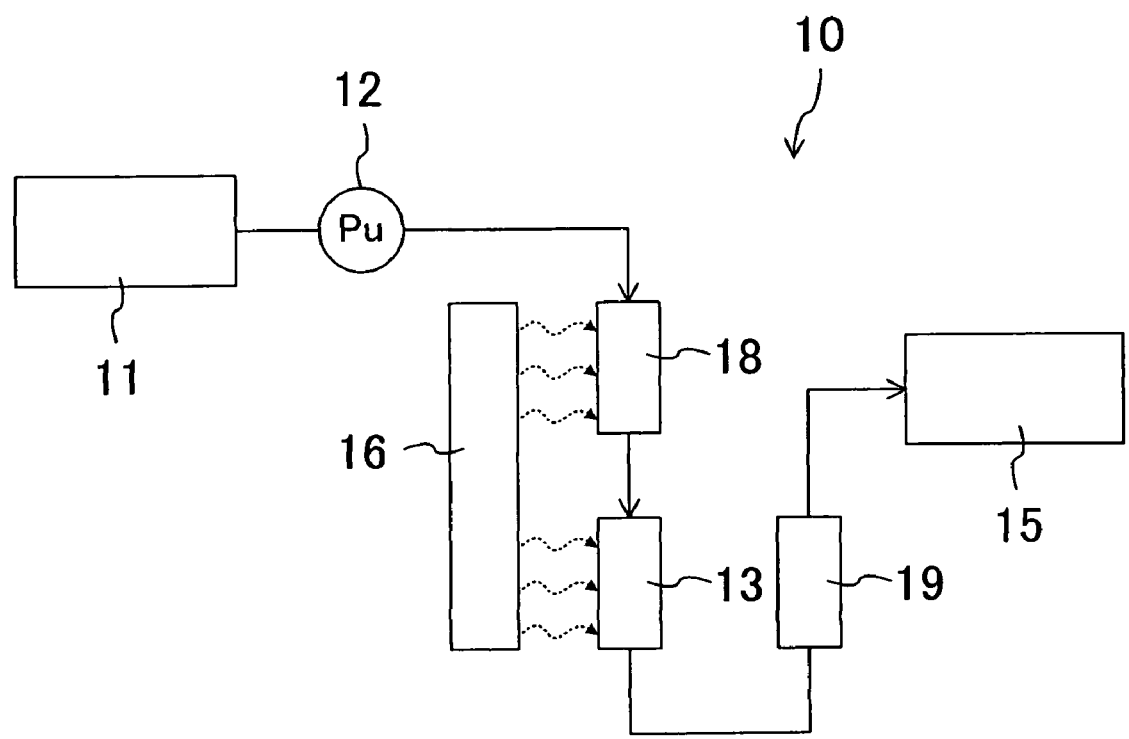
FIG. 4 shows a structure of a reaction device according to Embodiment 2.

FIG. 4 shows a reaction device 10 according to Embodiment 2. The elements having the same names as those of Embodiment 1 are denoted by the same reference numerals as those of Embodiment 1.

The reaction device 10 is a continuous type reactor capable of continuously producing a reaction product. The reaction device 10 includes a pipe extending from a reaction fluid supplier 11 to a product reservoir 15. The reaction device 10 also includes a fluid supplying pump 12, a preheating section 18, a reactor 13, and a cooler 19 which are provided in series at some midpoints in the pipe in this order when viewed from the upper reach to the lower reach with intervals therebetween. The reaction device 10 further includes a heater 16 which is provided such that the heater 16 can heat the preheating section 18 and the reactor 13.

The reaction device 10 is used for production of water gas, wherein: a reaction fluid, particularly a mixture of polyhydric alcohol (e.g., glycerin, propanediol, or the like) as the raw material and water, is supplied from the reaction fluid supplier 11 to the preheating section 18 via the fluid supplying pump 12; the reaction fluid preheated by the preheating section 18 is supplied to the reactor 13; polyhydric alcohol and water react in the reactor 13 to produce water gas; the reaction fluid containing the produced water gas is cooled by the cooler 19; and the cooled reaction fluid is stored in the product reservoir 15.

<Method for Producing Water Gas>

Next, a method for producing water gas using the reaction device 10 of Embodiment 2 is described.

The water gas production method of Embodiment 2 also uses polyhydric alcohol and water, as in Embodiment 1, to produce a mixture gas of hydrogen and carbon monoxide which is called water gas.

According to the water gas production method of Embodiment 2, the reaction fluid preheated in the preheating section 18 is supplied to the reactor 13.

The preheating time of the reaction fluid is preferably 0.1 second to 1 hour, more preferably 1 second to 10 minutes. (For example, where polyhydric alcohol is glycerin, the preheating time of the reaction fluid is preferably 0.1 second to 1 hour, more preferably 1 second to 10 minutes. Where polyhydric alcohol is propanediol, the preheating time of the reaction fluid is preferably 0.1 second to 1 hour, more preferably 1 second to 10 minutes.) The preheating time of the reaction fluid is determined by the residence time of the reaction fluid in the preheating section 18 and therefore can be controlled by selection of the capacity of the preheating section 18. If the capacity of the preheating section 18 is fixed, the preheating time of the reaction fluid is controlled by setting the feeding speed of the reaction fluid from the fluid supplying pump 12.

The preheating temperature of the reaction fluid is preferably 200° C. to 1000° C., more preferably 300° C. to 700° C. (For example, where polyhydric alcohol is glycerin, the preheating temperature of the reaction fluid is preferably 200° C. to 1000° C., more preferably 300° C. to 700° C. Where polyhydric alcohol is propanediol, the preheating temperature of the reaction fluid is preferably 200° C. to 1000° C., more preferably 300° C. to 700° C.) The preheating temperature of the reaction fluid is simultaneously controlled by adjusting the heating temperature of the reactor 13 heated by the heater 16.

According to the water gas production method of Embodiment 2, the reaction fluid containing water gas produced in the reactor 13 is cooled by the cooler 19.

The cooling time of the reaction fluid is preferably 0.1 second to 1 hour, more preferably 1 second to 10 minutes. The cooling time of the reaction fluid is determined by the residence time of the reaction fluid in the cooler 19 and therefore can be controlled by selection of the capacity of the cooler 19. If the capacity of the cooler 19 is fixed, the cooling time of the reaction fluid is controlled by setting the feeding speed of the reaction fluid from the fluid supplying pump 12.

The post-cooling temperature of the reaction fluid is preferably 0° C. to 200° C., more preferably 20° C. to 100° C. The post-cooling temperature of the reaction fluid is controlled by setting the cooling temperature of the reaction fluid in the cooler 19.

The other elements and functions/effects are the same as those of Embodiment 1.

EXAMPLES

We carried out water gas production experiments on examples and comparative examples described below and calculated the reaction consumption rate of the raw material for reaction, the yield of water gas, and the carbon residual rate. The reaction consumption rate of the raw material for reaction, the yield of water gas, and the carbon residual rate were calculated as described below. It should be noted that the "raw material for reaction" described herein refers to, specifically, glycerin, 1,2-propanediol, or 1-propanol.

—Reaction Consumption Rate of Raw Material—

Sampled liquid was subjected to gas chromatography analysis to quantitatively measure the concentration of unreacted raw material. The product by multiplication of the measured concentration and the quantity of the sampled liquid represents the quantity of unreacted raw material. The value of 100% minus the percentage of the quantity of unreacted raw material relative to the amount of the supplied raw material represents the reaction consumption rate.

—Yield of Water Gas—

Sampled gas was subjected to gas chromatography analysis to quantitatively measure the concentration of respective gas components including hydrogen, carbon monoxide, carbon dioxide, etc. The quantity of water gas, i.e., the total of quantity of hydrogen and carbon monoxide which were determined from the products by multiplication of the concentration of the gas components and the quantity of the sampled gas, was calculated. The ratio of the quantity of actually-produced water gas to the quantity of water gas theoretically determined from the quantity of supplied raw material for reaction was taken as the yield of water gas. It should be noted that the amount of water gas theoretically produceable from 1 mol of glycerin is 7 mol. The amount of water gas theoretically produceable from 1 mol of 1,2-propanediol is 5 mol. The amount of water gas theoretically produceable from 1 mol of 1-propanol is 6 mol.

—Carbon Residual Rate—

Sampled gas was subjected to gas chromatography analysis to quantitatively measure the concentration of respective gas components which contain carbon atoms, e.g., carbon monoxide, carbon dioxide, methane, ethane, ethylene, propane, propylene, and the like. The mole number of each of the gas components was calculated from the product by multiplication of the measured concentration of the gas component and the quantity of the sampled gas. The sampled liquid was subjected to gas chromatography analysis to quantitatively measure the unreacted raw material and the reaction product and determine the mole numbers thereof. The mole numbers of the respective components were converted to the mole numbers of carbon atoms included in the respective components and summed together. The value of 100% minus the percentage of the sum of the mole numbers of the carbon atom relative to the mole number of the carbon atom converted from the quantity of raw material supplied for reaction was taken as the carbon residual rate. With a high carbon residual rate, there is a possibility of inducing occlusion of the reactor or deactivation of the activity of catalyst. Thus, smaller carbon residual rate is more desirable for stable production of water gas.

Example 1

The reaction device of Example 1 is the same as that shown in FIG. 4. Specifically, the fluid supplying pump is a microfeeder; the preheating section is made of SUS316 and has a circular tube flow path with inside diameter of 1.0 mm and length of 2 m; the reactor is made of nickel (nickel purity>99.0%) and has a circular tube flow path with inside diameter of 2.18 mm and length of 0.10 m; the cooler is of air-cooling type, is made of SUS316, and has a circular tube flow path with inside diameter of 1.0 mm and length of 0.5 m; and the heater is an electric furnace of radial heat transmitting type capable of heating the preheating section and the reactor to and maintaining them at 600° C. In this reaction device, the inner wall of the reactor constitutes a metal catalyst layer.

This reaction device was subjected to pre-reaction treatment A such that the device was heated to and maintained at 600° C. for one hour with hydrogen flowed therethrough.

After pre-reaction treatment A on the reaction device, a solution prepared in advance by mixing 36.2 g of glycerin (manufactured by Kishida Chemical Co., Ltd., special grade) and 63.8 g of distilled water (manufactured by Wako Pure Chemical Industries, Ltd.) was supplied as the reaction fluid by the microfeed pump at 0.218 mL/h to the preheating section.

The reaction fluid from the cooler, containing mixed gas and liquid, was sampled in a Tedlar bag. The liquid composition and gas composition of the sampled reaction fluid were separately analyzed.

The result showed that the reaction consumption rate of glycerin was 100%. The composition of the sampled gas is shown in TABLE 1. The yield of the water gas was 76.6%. The carbon residual rate was 0%.

Example 2

The reaction device of Example 2 is the same as that of Example 1 except that the reactor is a circular tube made of SUS316 having a linear reaction path with inside diameter of 1.78 mm and length of 0.10 m, and that 20 nickel wires (manufactured by PURATRONIC Corporation, nickel purity=99.994%) each having diameter of 100 μm and length of 0.10 m are provided in the reaction path of the reactor. The nickel wires are unstranded and extend substantially in parallel with the fluid flow path of the reactor. Performing a calculation on the assumption that catalyst is in parallel to the direction of flow of the reaction fluid, $\Sigma A/\Sigma S$ was $2.5 \times 10^{-4}$ where $\Sigma S$ is the total sum of surface areas S of catalyst and $\Sigma A$ is the total sum of projected areas A on a plane perpendicular to the direction of flow of the reaction fluid.

This reaction device was subjected to pre-reaction treatment A such that the device was heated to and maintained at 600° C. for one hour with hydrogen flowed therethrough.

After pre-reaction treatment A on the reaction device, a solution prepared in advance by mixing 36.2 g of glycerin (manufactured by Kishida Chemical Co., Ltd., special grade) and 63.8 g of distilled water (manufactured by Wako Pure Chemical Industries, Ltd.) was supplied as the reaction fluid by the microfeed pump at 0.136 mL/h to the preheating section.

The reaction fluid from the cooler, containing mixed gas and liquid, was sampled in a Tedlar bag. The liquid composition and gas composition of the sampled reaction fluid were separately analyzed.

The result showed that the reaction consumption rate of glycerin was 100%. The composition of the sampled gas is shown in TABLE 1. The yield of the water gas was 71.0%. The carbon residual rate was 4.9%.

Example 3

The reaction device of Example 3 is the same as that of Example 1 except that the preheating section is made of SUS316 and has a circular tube flow path with inside diameter of 1.0 mm and length of 1 m and that the reactor is made of nickel (nickel purity>99.0%) and has a circular tube flow path with inside diameter of 4.35 mm and length of 0.10 m.

This reaction device was subjected to pre-reaction treatment A such that the device was heated to and maintained at 600° C. for one hour with hydrogen flowed therethrough.

After pre-reaction treatment A on the reaction device, a solution prepared in advance by mixing 31.9 g of 1,2-propanediol (manufactured by SIGMA-ALDRICH Japan K.K., SAJ 1st grade) and 68.1 g of distilled water (manufactured by Wako Pure Chemical Industries, Ltd.) was supplied as the reaction fluid by the microfeed pump at 0.880 mL/h to the preheating section.

The reaction fluid from the cooler, containing mixed gas and liquid, was sampled in a Tedlar bag. The liquid composition and gas composition of the sampled reaction fluid were separately analyzed.

The result showed that the reaction consumption rate of 1,2-propanediol was 99.3%. The composition of the sampled gas is shown in TABLE 1. The yield of the water gas was 73.2%. The carbon residual rate was 2.4%.

Example 4

The reaction device of Example 4 is the same as that of Example 3. This reaction device was subjected to pre-reaction treatment A such that the device was heated to and maintained at 600° C. for one hour with hydrogen flowed therethrough.

After pre-reaction treatment A on the reaction device, a solution prepared in advance by mixing 36.2 g of glycerin (manufactured by Kishida Chemical Co., Ltd., special grade) and 63.8 g of distilled water (manufactured by Wako Pure Chemical Industries, Ltd.) was supplied as the reaction fluid by the microfeed pump at 0.867 mL/h to the preheating section.

The reaction fluid from the cooler, containing mixed gas and liquid, was sampled in a Tedlar bag. The liquid composition and gas composition of the sampled reaction fluid were separately analyzed.

The result showed that the reaction consumption rate of glycerin was 100%. The composition of the sampled gas is shown in TABLE 1. The yield of the water gas was 91.0%. The carbon residual rate was 4.8%.

Example 5

The reaction device of Example 5 is the same as that of Example 3 except that the reactor is made of nickel, has a circular tube flow path with inside diameter of 4.35 mm and length of 0.10 m, and is plated with platinum. In this reaction device, the inner wall of the reactor constitutes a metal catalyst layer.

This reaction device was subjected to pre-reaction treatment B such that residues were removed from the surface of the inner wall, and then, the device was heated to and maintained at 600° C. for three hours with hydrogen flowed therethrough.

After pre-reaction treatment B on the reaction device, a solution prepared in advance by mixing 36.2 g of glycerin (manufactured by Kishida Chemical Co., Ltd., special grade) and 63.8 g of distilled water (manufactured by Wako Pure Chemical Industries, Ltd.) was supplied as the reaction fluid by the microfeed pump at 0.867 mL/h to the preheating section.

The reaction fluid from the cooler, containing mixed gas and liquid, was sampled in a Tedlar bag. The liquid composition and gas composition of the sampled reaction fluid were separately analyzed.

The result showed that the reaction consumption rate of glycerin was 100%. The composition of the sampled gas is shown in TABLE 1. The yield of the water gas was 78.4%. The carbon residual rate was 0%.

Example 6

The reaction device of Example 6 is the same as that of Example 3 except that the reactor is made of nickel, has a circular tube flow path with inside diameter of 4.35 mm and length of 0.10 m, and is plated with iridium.

This reaction device was subjected to pre-reaction treatment B such that residues were removed from the surface of the inner wall, and then, the device was heated to and maintained at 600° C. for three hours with hydrogen flowed therethrough.

After pre-reaction treatment B on the reaction device, a solution prepared in advance by mixing 36.2 g of glycerin (manufactured by Kishida Chemical Co., Ltd., special grade) and 63.8 g of distilled water (manufactured by Wako Pure Chemical Industries, Ltd.) was supplied as the reaction fluid by the microfeed pump at 0.867 mL/h to the preheating section.

The reaction fluid from the cooler, containing mixed gas and liquid, was sampled in a Tedlar bag. The liquid composition and gas composition of the sampled reaction fluid were separately analyzed.

The result showed that the reaction consumption rate of glycerin was 100%. The composition of the sampled gas is shown in TABLE 1. The yield of the water gas was 81.6%. The carbon residual rate was 0%.

Example 7

The reaction device of Example 7 is the same as that of Example 3.

This reaction device was subjected to pre-reaction treatment B such that residues were removed from the surface of the inner wall, and then, the device was heated to and maintained at 600° C. for three hours with hydrogen flowed therethrough.

After pre-reaction treatment B on the reaction device, a solution prepared in advance by mixing 36.2 g of glycerin (manufactured by Kishida Chemical Co., Ltd., special grade) and 63.8 g of distilled water (manufactured by Wako Pure Chemical Industries, Ltd.) was supplied as the reaction fluid by the microfeed pump at 0.867 mL/h to the preheating section.

The reaction fluid from the cooler, containing mixed gas and liquid, was sampled in a Tedlar bag. The liquid composition and gas composition of the sampled reaction fluid were separately analyzed.

The result showed that the reaction consumption rate of glycerin was 99.7%. The composition of the sampled gas is shown in TABLE 1. The yield of the water gas was 88.7%. The carbon residual rate was 0%.

Comparative Example 1

The reaction device of Comparative Example 1 is the same as that of Example 2 except that the metal catalyst in the reaction path of the reactor is 0.9442 g of nickel powder (manufactured by Wako Pure Chemical Industries, Ltd.) having the particle size of 150 μm or less instead of the nickel wires. Performing a calculation on the assumption that the catalyst has the shape of a perfect sphere, $\Sigma A/\Sigma S$ was 0.25 where $\Sigma S$ is the total sum of surface areas S of catalyst and $\Sigma A$ is the total sum of projected areas A on a plane perpendicular to the direction of flow of the reaction fluid.

This reaction device was subjected to pre-reaction treatment A such that the device was heated to and maintained at 600° C. for one hour with hydrogen flowed therethrough.

After pre-reaction treatment A on the reaction device, a solution prepared in advance by mixing 36.2 g of glycerin (manufactured by Kishida Chemical Co., Ltd., special grade) and 63.8 g of distilled water (manufactured by Wako Pure Chemical Industries, Ltd.) was supplied as the reaction fluid by the microfeed pump at 0.083 mL/h to the preheating section.

The reaction fluid from the cooler, containing mixed gas and liquid, was sampled in a Tedlar bag. The liquid composition and gas composition of the sampled reaction fluid were separately analyzed.

The result showed that the reaction consumption rate of glycerin was 100%. The composition of the sampled gas is shown in TABLE 1. The yield of the water gas was 55.6%. The carbon residual rate was 21.5%.

Comparative Example 2

The reaction device of Comparative Example 2 is the same as that of Example 2 except that the reactor is a tube made of SUS316 having a linear reaction path with inside diameter of 2.18 mm and length of 0.10 m and that the metal catalyst in the reaction path is 0.1036 g of platinum black powder (manufactured by Wako Pure Chemical Industries, Ltd.) having the particle size of 2 μm or less (observed by human eyes through optical microscope) instead of the nickel wires. Performing a calculation on the assumption that the catalyst has the shape of a perfect sphere, $\Sigma A/\Sigma S$ was 0.25 where $\Sigma S$ is the total sum of surface areas S of catalyst and $\Sigma A$ is the total sum of projected areas A on a plane perpendicular to the direction of flow of the reaction fluid.

This reaction device was subjected to pre-reaction treatment A such that the device was heated to and maintained at 600° C. for one hour with hydrogen flowed therethrough.

After pre-reaction treatment A on the reaction device, a solution prepared in advance by mixing 36.2 g of glycerin (manufactured by Kishida Chemical Co., Ltd., special grade) and 63.8 g of distilled water (manufactured by Wako Pure Chemical Industries, Ltd.) was supplied as the reaction fluid by the microfeed pump at 0.193 mL/h to the preheating section.

The reaction fluid from the cooler, containing mixed gas and liquid, was sampled in a Tedlar bag. The liquid composition and gas composition of the sampled reaction fluid were separately analyzed.

The result showed that the reaction consumption rate of glycerin was 76.8%. The composition of the sampled gas is shown in TABLE 1. The yield of the water gas was 24.2%. The carbon residual rate was 39.9%.

Comparative Example 3

The reaction device of Comparative Example 3 is the same as that of Example 3.

This reaction device was subjected to pre-reaction treatment A such that the device was heated to and maintained at 600° C. for one hour with hydrogen flowed therethrough.

After pre-reaction treatment A on the reaction device, a solution prepared in advance by mixing 27.0 g of 1-propanol (manufactured by KANTO KAGAKU, Shika-1st grade) and 73.0 g of distilled water (manufactured by Wako Pure Chemical Industries, Ltd.) was supplied as the reaction fluid by the microfeed pump at 0.885 mL/h to the preheating section.

The reaction fluid from the cooler, containing mixed gas and liquid, was sampled in a Tedlar bag. The liquid composition and gas composition of the sampled reaction fluid were separately analyzed.

The result showed that the reaction consumption rate of 1-propanol was 100%. The composition of the sampled gas is shown in TABLE 1. The yield of the water gas was 67.3%. The carbon residual rate was 23.7%.

CONCLUSION

TABLE 1 shows the structure of the reaction path and other details of the reactor of the reaction devices used in Examples 1 to 7 and Comparative Examples 1 to 3 and the test evaluation results.

TABLE 1

| | Reaction Device | | | | | | | |
|---|---|---|---|---|---|---|---|---|
| | Catalyst | | | | | Flow Path | | |
| | Metal | Form | Catalyst Diameter (mm) | $\Sigma A/\Sigma S$ — | Catalyst Amount (g) | Flow Path Diameter (mm) | Flow Path Length (mm) | Reaction Raw Material |
| Example 1 | Ni | Tube | — | 0 | — | 2.18 | 100 | Glycerin |
| Example 2 | Ni | Wire | 0.10 | $2.5 \times 10^{-4}$ | — | 1.78 | 100 | Glycerin |
| Example 3 | Ni | Tube | — | 0 | — | 4.35 | 100 | 1,2-propanediol |
| Example 4 | Ni | Tube | — | 0 | — | 4.35 | 100 | Glycerin |
| Example 5 | Pt | Tube | — | 0 | — | 4.35 | 100 | Glycerin |
| Example 6 | Ir | Tube | — | 0 | — | 4.35 | 100 | Glycerin |
| Example 7 | Ni | Tube | — | 0 | — | 4.35 | 100 | Glycerin |
| Comparative Example 1 | Ni | Powder | ≤0.15 | 0.25 | 0.9442 | 1.78 | 100 | Glycerin |
| Comparative Example 2 | Pt | Powder | ≤0.002 | 0.25 | 0.1036 | 2.18 | 100 | Glycerin |
| Comparative Example 3 | Ni | Tube | — | 0 | — | 4.35 | 100 | 1-propanol |

| | Raw Material Flow Rate (mL/h) | Reaction Consumption Rate (%) | Water Gas Yield (%) | Carbon Yield (%) | Carbon Residual Rate (%) | Gas Composition | | | |
|---|---|---|---|---|---|---|---|---|---|
| | | | | | | $H_2$ (%) | CO (%) | $CO_2$ (%) | $CH_4$ (%) |
| Example 1 | 0.218 | 100.0 | 76.6 | 100.0 | 0.0 | 58.7 | 12.4 | 26.8 | 2.0 |
| Example 2 | 0.136 | 100.0 | 71.0 | 95.1 | 4.9 | 57.7 | 16.6 | 23.6 | 1.9 |
| Example 3 | 0.880 | 99.3 | 73.2 | 97.6 | 2.4 | 62.2 | 14.8 | 20.1 | 2.6 |
| Example 4 | 0.867 | 100.0 | 91.0 | 95.2 | 4.8 | 63.7 | 17.4 | 17.7 | 1.1 |
| Example 5 | 0.867 | 100.0 | 78.4 | 100.0 | 0.0 | 54.4 | 28.0 | 14.1 | 3.4 |

TABLE 1-continued

| | | | | | | | | | |
|---|---|---|---|---|---|---|---|---|---|
| Example 6 | 0.867 | 100.0 | 81.6 | 100.0 | 0.0 | 54.5 | 27.2 | 15.0 | 3.3 |
| Example 7 | 0.867 | 99.7 | 88.7 | 100.0 | 0.0 | 60.4 | 20.3 | 17.9 | 1.3 |
| Comparative Example 1 | 0.083 | 100.0 | 55.6 | 78.5 | 21.5 | 58.5 | 10.4 | 28.9 | 2.2 |
| Comparative Example 2 | 0.193 | 76.8 | 24.2 | 60.1 | 39.9 | 57.9 | 13.8 | 22.4 | 2.6 |
| Comparative Example 3 | 0.885 | 100.0 | 67.3 | 76.3 | 23.7 | 71.2 | 9.4 | 16.0 | 1.9 |

Comparing Examples 1 and 2 and Comparative Example 1, it is appreciated that a reaction device having a small $\Sigma A/\Sigma S$ value results in a low carbon residual rate. The same can also be seen from the comparison of Example 5 and Comparative Example 2. It is also appreciated that, among such reaction devices having small $\Sigma A/\Sigma S$ values, a reaction device is more preferable wherein the inner wall of the reaction path is formed by a metal catalyst layer such that $\Sigma A/\Sigma S$ is 0 (zero).

Comparing Examples 3 and 4 and Comparative Example 3, it is appreciated that the use of polyhydric alcohol as the raw material for reaction results in a low carbon residual rate.

Comparing Examples 5 to 7, it is appreciated that the difference in metal type has only a small effect on the carbon residual rate.

INDUSTRIAL APPLICABILITY

The present invention is useful for a reaction device used in production of water gas from polyhydric alcohol and water and a water gas production method carried out using the reaction device.

The invention claimed is:

1. A reaction device for use in production of water gas from polyhydric alcohol and water, the device comprising a reactor which has a reaction field where a catalyst is provided inside and a reaction fluid flows, wherein the catalyst has a surface extending in a direction of flow of the reaction fluid, wherein the catalyst has an elongated structure and has a $\Sigma A/\Sigma S$ value of 0.2 or less where $\Sigma S$ is a total sum of surface areas S of units of catalyst and $\Sigma A$ is a total sum of projected areas A of the units of catalyst on a plane perpendicular to the direction of flow of the reaction fluid.

2. The reaction device of claim 1, wherein the catalyst continuously extends in the direction of flow of the reaction fluid.

3. The reaction device of claim 1, wherein the catalyst constitutes the inner wall of the reactor.

4. The reaction device of claim 1, wherein the catalyst includes any of metals of Group 8 to Group 10 in the periodic chart.

5. A method for producing water gas from polyhydric alcohol and water, comprising the step of producing water gas by flowing a reaction fluid containing polyhydric alcohol and water in a reaction field provided with catalyst which has a surface extending in a direction of flow of the reaction fluid to react polyhydric alcohol and water.

* * * * *